June 22, 1954  L. F. NORRIS ET AL  2,681,747
BULK MILK TRANSPORTING AND DISPENSING APPARATUS
Filed Jan. 18, 1952  2 Sheets-Sheet 1
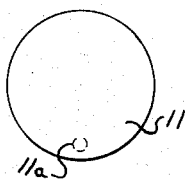
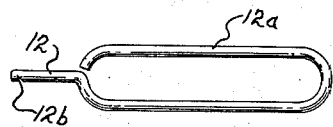
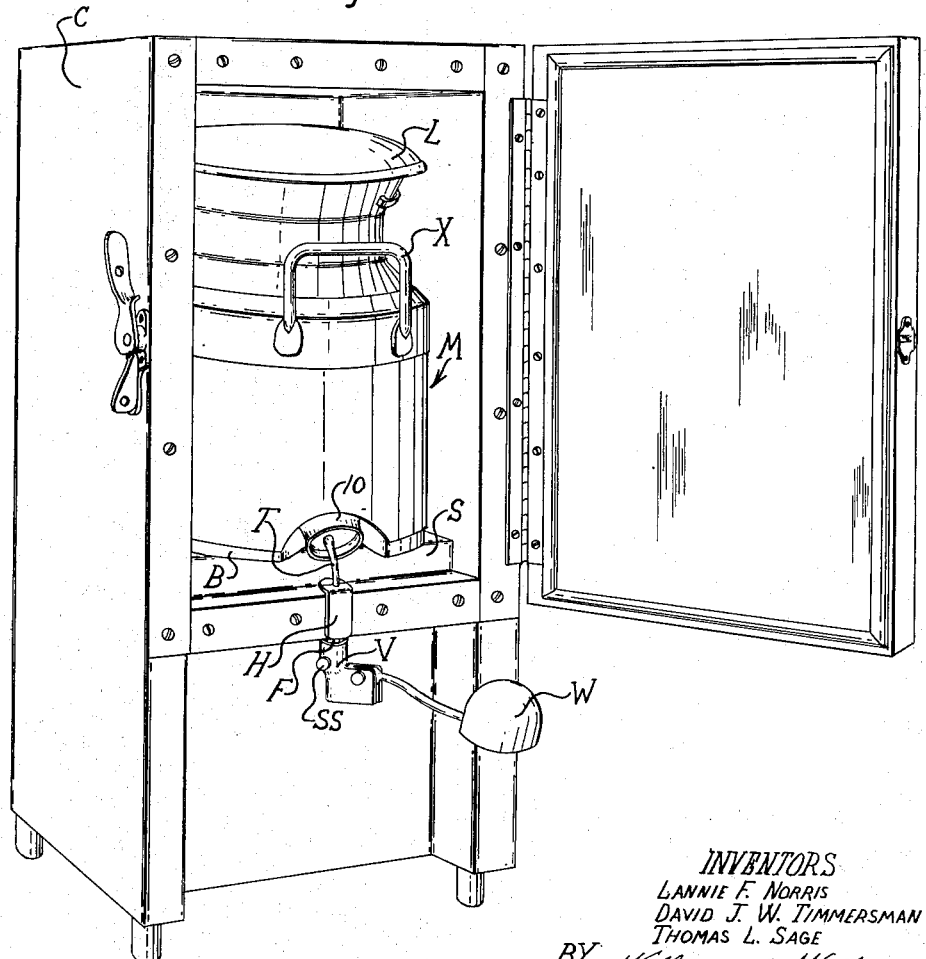
INVENTORS
LANNIE F. NORRIS
DAVID J. W. TIMMERSMAN
THOMAS L. SAGE
BY Williamson & Williamson
ATTORNEYS

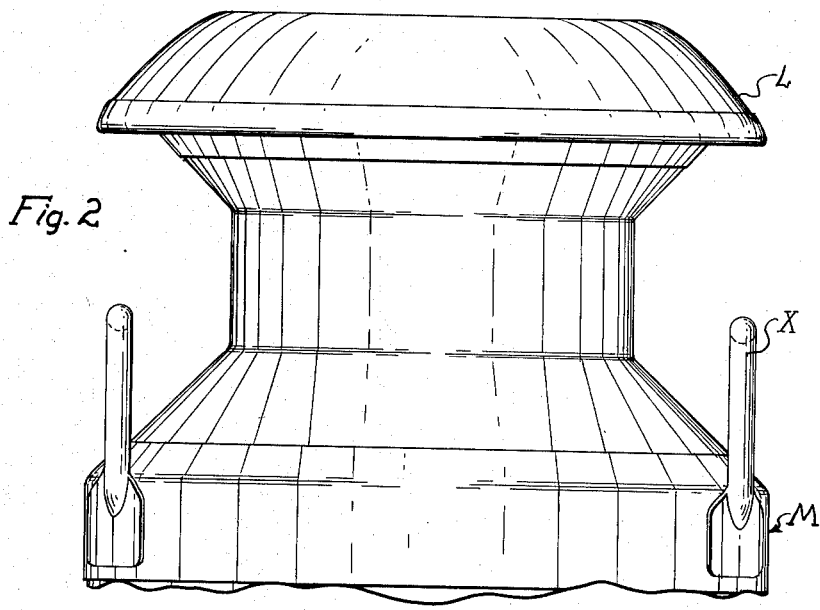
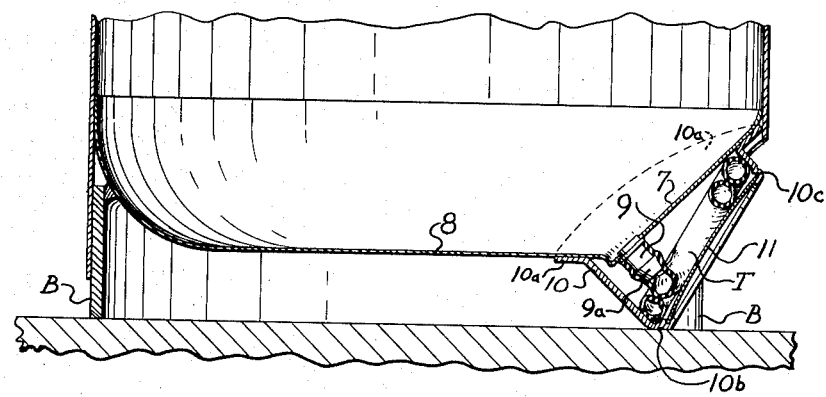
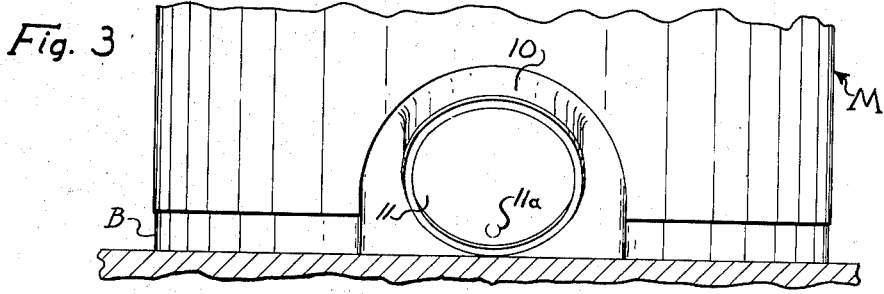
INVENTORS
LANNIE F. NORRIS
DAVID J. W. TIMMERSMAN
THOMAS L. SAGE
BY Williamson & Williamson
ATTORNEYS Patented June 22, 1954

2,681,747

UNITED STATES PATENT OFFICE 2,681,747

BULK MILK TRANSPORTING AND
DISPENSING APPARATUS

Lannie F. Norris, David J. W. Timmersman, and
Thomas L. Sage, Minneapolis, Minn., assignors
to Norris Dispensers, Inc., Minneapolis, Minn.,
a corporation of Minnesota Application January 18, 1952, Serial No. 267,107

5 Claims. (Cl. 222—185)

This invention relates to sanitary liquid dispensing apparatus and particularly to that type of apparatus specially suited to the dispensing of homogenized milk, fruit juices and other beverages from a bulk container through the medium of a "single use" sanitary, flexible tube which may be collapsed near the delivery end by a pinch cock valve and periodically released and distended to dispense small quantities of the liquid. Such general structure is disclosed in Norris Patent 2,377,261 issued May 29, 1945 and in the allowed patent application entitled "Liquid Dispensing Cabinet," Serial Number 199,762, filed December 8, 1950 and maturing into Patent 2,601,319.

Milk and other beverage dispensers embodying the invention of said patent and patent application and housed in refrigerated cabinets, have been favorably received and widely used in restaurants, institutions, offices and factories and have enabled bulk milk cans equipped with special discharge nipples, base protective flanges and flexible tube-retaining means in the bottom thereof, to be used by creameries for supplying the cabinet dispensers at the restaurant with collapsible dispensing tube retained in place and protected during filling operations at the creamery and during transportation, by the base flange of the can.

The use of such efficient and economical bulk containers and "single use," throw-away dispensing tubes has to a large extent displaced the expensive, wasteful and bulky use of individual bottles or other containers in the restaurants, hotels, etc., for furnishing individual servings to customers. Substantial economies in handling, storage, breakage and container costs, have been achieved through the wide use of dispensing apparatus of the type disclosed in said patent and in said patent application.

The apparatus and "single use," flexible dispensing tubes have met most requirements for health and sanitation in the various states of this country and in most of the cities and metropolitan areas thereof, since with said structure, the flexible tube at the creamery is sterilized and fast-coupled to the nipple of the container or can before the same is filled and is initially permanently sealed at the outer or free end thereof. When the container and its accompanying "single use" tube is set up in the dispensing cabinet at the restaurant, the lower and free end of the tube is inserted through a fitting which has a pinch cock valve mounted therein and the extremity of this tube, including the seal or plug, is readily cut off, leaving little chance of contamination, even though the exterior of the tube may have been engaged by other objects in transportation.

It is an object of the present invention to provide bulk can, flexible tube, liquid dispensing apparatus wherein a protective and sealed tube-housing chamber is inherently provided by the container to receive and retain an elongated, flexible tube communicating with the interior of the container when the same is coiled or folded in compact position and whereby the exterior of this tube and the bottom of the container and the tube-containing chamber may all be completely sterilized at the creamery before filling and transportation of the can.

A further object is the provision of an improved liquid dispenser structure well suited to economical manufacture and employing a closely cooperating structural relation between the bottom of a bulk can made for the most part, of standard construction, a dispensing nipple in the bottom thereof, a chamber defining shell or housing surrounding the nipple and a portion of the bottom and a "single use," elongated, collapsible tube initially sealed at its outer end and detachably coupled with the nipple and compactly enclosed in the chamber formed by said housing plus a removable sealing plate for closing access opening to said chamber and tube.

More specifically, it is an object of the present invention to provide very simple but highly efficient liquid dispensing structure of the class described which utilizes in the inherent construction of a milk can or the like, an annular, chamber-defining shell or housing affixed and sealed to a portion of the bottom of the container preferably flatted or specially formed to receive the same and surrounding in spaced relation, a lower dispensing nipple fixed to the bottom of the can and protected by a base skirt of the can, in combination with a removable sealing disc or plate for closing and sealing the outer peripheral edge of said housing, all in combination with an elongated, "single use" dispensing tube of elastic material coupled with said nipple at one end and having its opposite end initially plugged and sealed. This structure provides for the coiling or other compacting of the flexible tube within a completely sealed enclosure and chamber, protected by the base flange or skirt of the can and the general periphery of the body thereof. This structure will meet the most rigid requirements for sanitation and will not permit of contamination of even the exterior of tube or nipple during handling and transportation.

The foregoing and other objects and advantages of our invention will more fully appear from the following drawings, wherein like reference characters refer to the same or similar parts throughout the several views, and in which:

Fig. 1 is a perspective view illustrating an embodiment of our dispensing apparatus, including bulk container, sealed protective housing and "single use" dispensing tube cooperatively associated with the can support housing, valve fitting and pinch cock valve of an ornamental refrigerated dispenser cabinet;

Fig. 2 is a view partly in side elevation and partly in vertical section with the can fore-shortened, showing the structure of our apparatus with the flexible dispensing tube coiled in compact relation and protectively sealed by the removable sealing disc and chamber-forming shell of our improved construction;

Fig. 3 is a front elevation of the lower part of the can or bulk container shown in Fig. 2 with the sealing disc applied to the protective shell or housing;

Fig. 4 is a plan view of a suitable type of sealing disc detached; and

Fig. 5 is a plan view of a suitable disc-removal tool for first punching out an aperture in the disc and thereafter extracting the disc from the annular retaining flange of the housing.

In the drawings, an embodiment of our apparatus is shown in its cooperative relation at a location such as a restaurant or factory, with an ornamental refrigerated cabinet C having a supporting shelf S for receiving the base flange of the bulk can and having adjacent the lower edge of the doorway, and in stepped relation to the supporting shelf S, a tube-receiving metal housing H which terminates in a depending, tubular fitting F to which the pinch cock valve structure V is detachably secured and by which it is supported. The valve housing as shown, is secured to the rigid, depending fitting F by heavy set screw SS which is tapped to the tubular, upper portion of the valve casing and has its inner end engaged in the deep annular groove of the fitting. Within the valve casing V a horizontally slidable tongue-type pinch valve element is mounted, urged and maintained in protracted tube-collapsing position by a lever weight W. Such structure is shown in detail and described in co-pending application, S. N. 199,762 and does not require detailed description here. The flexible dispensing tube projects through the valve structure and depends a short distance below the lower edge of the valve casing and is sheared off at the restaurant to remove the plug or seal and consequently, open the tube.

Our apparatus lends itself to use with conventional refrigerated cabinets, can supports and pinch valve structures widely employed commercially at the present time.

In the embodiment illustrated, a bulk milk can M for the most part of conventional structure, usually manufactured from stainless steel is employed, having special novel and patentable features embodied at the bottom and discharge end thereof. The can has the usual lid or stopper L, reinforced upper shoulders to which are attached the handle X and the relatively heavy protective skirt or base flange B which may be welded to the lower portion of the cylindrical body of the can and which extends for an inch or more below the bottom of the can.

With our construction, the base flange or skirt is broken away at the forward portion of the can and the bottom of the can is preferably flatted along an area 7 which extends diagonally, say approximately 45 degrees to the bottom 8. At the lower or sump portion of the flatted area 7, a discharge nipple 9 is secured, being clinched to the sheet metal of the can and having a tube retaining bead or annular flange 9a at the extremity thereof. The nipple preferably extends perpendicular to the flatted area 7 and is of course in communication with the interior of the can.

We provide a chamber-defining shell or housing 10 surrounding the flatted area 7 of the can and also nipple 9 in spaced relation thereto. This housing, as shown, is annular in form and has a turned attachment flange 10a which is shaped to fit the corresponding contour of the bottom portion of the can to which it is affixed and sealed, preferably by welding. It will be noted that the entire configuration of the annular housing 10, lies within the general confines of the periphery and protective base flange B of the can.

The shell 10 at its lower and central portion forms a leg or sump 10b which lies in the plane defined by the reinforcing base flange B and thereby acts in cooperation with the base flange to support the weight of the can and its contents.

The outer annular end of the shell 10 has formed adjacent the extremity thereof, an annular sealing groove 10c which is adapted to seat and retain a flexible, "throw-away" sealing plate or disc 11. This disc may be constructed of sheet metal, plastic or a strong cardboard composition or the like and it has sufficient flexibility and resiliency to permit of its insertion through the mouth edge of housing 10 and its subsequent opposite flexing and expansion to cause its peripheral edge to be firmly seated and sealed in the internal sealing groove 10c.

A "single use," flexible dispensing tube constructed of sterilized, synthetic rubber or some other elastic material which has the readiness to be collapsed and to distend back to normal open position, forms an important part and component of our dispensing apparatus. This tube is elongated and is preferably cut to a length which when connected at one end to nipple 9, may be extended downwardly through the bottom or shelf of the cabinet and a tube-receiving housing H if such is utilized and also through the valve casing V to a point a short distance therebelow. One end of the tube is open and its lower end is sealed as by a sterilized, permanently affixed rubber plug to constitute during filling and transportation of the can, a closure, and is purposely of a length to extend slightly below the valve structure so that when its extremity is sheared off to remove the plug and open the tube, reuse of the tube will be substantially impossible.

The tubes are supplied to the creamery or other source of the milk or other beverages to be sold, preferably in sterilized condition within sealed wrappers. In any event, when a tube is applied to a can, the open end is fitted over the nipple 9 subsequently to complete sterilization of the can and the chamber defined by shell 10 and the enclosed bottom portion of the can. The elongated tube is then coiled or compactly folded into the confined chamber within shell 10 and is retained there by its inherent resiliency and tendency to straighten out. Thereafter, the sterilized sealing disc 11 is applied to the lip or mouth of shell 10 by exerting a slight pressure whereupon its peripheral edge seats and seals in the sealing groove 10c of the collar.

The can, when filled, is then ready for commercial transportation and handling and in no instance, can any foreign substance contact the interior of the chamber formed by housing 10 or the flexible tube T contained therein.

The discs 11 are preferably scored or weakened about a very small circular area to form a punchout 11a to facilitate insertion of the removal tool.

In Fig. 5, a suitable seal-removing tool is illustrated comprising a rod looped to form an elongated handle 12a and having a centrally and longitudinally projecting straight stem 12 which terminates in a blunt end of a diameter to properly punch out the weakened portion 11a of the sealing plate or disc. The stem 12 is further provided with a shouldered notch 12b spaced a short distance from its extremity to facilitate engagement of the thickness of the disc for removal thereof.

From the foregoing description it will be seen that the bulk cans with the specially constructed bottom, chamber-defining housing, sealing disc and elongated, coilable, flexible tube initially sealed at its outer end, constitute an extremely efficient and highly sanitary dispenser unit for liquids whereby in cooperation with a can support and properly related pinch cock valve, small servings of a beverage can be quickly and easily obtained from a bulk container.

Our improved apparatus is particularly advantageous for handling, transportation and the setting up of the apparatus for operation in a restaurant or other place of business.

The tube and nipple are thoroughly protected and sealed for exclusion of air and dust by the enclosed sealed chamber formed by the housing 10 and the removable sealing disc 11. The combination of this structure with the inherent resilient and flexible nature of the tube, makes compact housing and protection of the already connected tube possible, without adding any obstructions or protrusions to the configuration of the can itself.

It will of course be understood that various changes may be made in the form, details and arrangements of parts without departing from the scope of our invention.

What is claimed is:

1. In sanitary liquid dispensing apparatus, a bulk container having the main portion of the body thereof of vertical, cylindrical shape and having a base flange and a bottom wall spaced upwardly from the lower edge of said flange, a portion of the lower part and bottom of said body being diagonally disposed with reference to the bottom proper and periphery of said container and extending inwardly of said base flange, a nipple secured to the lower part of said diagonal portion and communicating with the interior of said container, an encircling housing affixed to said diagonal portion of said container and surrounding in spaced relation said nipple and defining a chamber about said nipple, said housing having a relatively large opening giving access to said chamber and to said nipple and having means for detachably securing a closure seal across said opening, said housing extending within the general confines of the lower periphery of said container and being of dimensions to receive, house and retain an elongated, flexible and elastic conduit connected with said nipple.

2. In a bulk liquid container for use with a sanitary pinch valve dispensing apparatus, a container bottom with an upstanding rigid container side wall, said side wall being recessed to permit a compartment-forming shell to be received therein and to be disposed completely within the peripheral confines of the container, a compartment-forming shell mounted in fixed relation within said recess and disposed entirely within the peripheral confines of said side wall and having an annular mouth opening at the outer end thereof, the lower peripheral edge of said mouth being disposed closer to the center of said container than the upper portion thereof to provide clearance for a tube extending downwardly in substantially straight-line relation from within the shell, a discharge nipple communicating with the interior of the lower portion of the container in fixed relation thereto and disposed in generally downwardly extending relation and mounted wholly within the confines of said shell, a flexible tube connected with said nipple and adapted to be completely received within said shell for storing and to be extended downwardly in substantially straight-line direction from said nipple for operation, and a removable sealing closure having a peripheral edge adapted to interfit with the mouth opening of said shell for effectively closing and sealing the chamber defined by the shell and containing the flexible element when compacted.

3. In a bulk liquid container for use with a sanitary pinch valve dispensing apparatus, an upstanding rigid container side wall, a container bottom sealingly fixed in the lower portion thereof in spaced relation above the lower peripheral edge thereof to form a base flange extending below said container bottom, said base flange being recessed to permit a compartment-forming shell to be received therein and to be disposed completely within the peripheral confines thereof, a compartment-forming shell mounted in fixed relation within said recess and disposed entirely within the peripheral confines of said base flange and having an annular mouth opening at the outer end thereof, the lower peripheral edge of said mouth being disposed closer to the center of the container than the upper portion thereof to provide clearance for a discharge tube extending downwardly in substantially straight-line relation from within the shell, a discharge nipple communicating with the interior of the lower portion of the container in fixed relation thereto and disposed in generally downwardly and outwardly inclined relation and mounted wholly within the confines of said shell, a flexible tube connected with said nipple and adapted to be completely received within said shell for storing and to be extended in downwardly and outwardly inclined, substantially straight line relation from said nipple for operation, and a removable sealing closure having a peripheral edge adapted to interfit with the mouth opening of said shell for effectively closing and sealing the chamber defined by said shell and containing the flexible element when compacted.

4. In a bulk liquid container for use with a sanitary pinch valve dispensing apparatus, a container bottom with an upstanding rigid container side wall, said side wall having a shell-receiving opening formed therein, a compartment forming shell mounted in said side wall opening and disposed entirely within the peripheral confines of said side wall and having an annular mouth opening at the outer end thereof, the lower peripheral edge of said mouth opening being disposed closer to the center of the container than the upper portion thereof to provide a downwardly and inwardly inclined mouth opening, a hollow discharge nipple mounted in fixed relation in the lower portion of said container and communicating with the interior thereof and extending downwardly in outwardly inclined relation wholly within the confines of said shell, the inclined position of said nipple and the inclined relation of said mouth opening cooperating to permit a flexible tube mounted on said nipple to be disposed in substantially straight line downwardly inclined relation from said nipple when in dispensing position.

5. The structure set forth in claim 4 and the container bottom being disposed in upwardly spaced relation from the lower end of said side wall to form a container base flange and said shell-receiving opening being formed in said base flange with the shell underlying a portion of the container bottom and said nipple being fixed to a portion of the container bottom disposed within the confines of said shell.

References Cited in the file of this patent

UNITED STATES PATENTS

| Number | Name | Date |
|---|---|---|
| 2,023,837 | Heins | Dec. 10, 1935 |
| 2,275,607 | Bramming | Mar. 10, 1942 |
| 2,377,261 | Norris | May 29, 1945 |
| 2,549,207 | Kestenbaum | Apr. 17, 1951 |